Dec. 2, 1941.  A. J. HIXON  2,264,754
CABLE CONNECTOR
Filed Dec. 14, 1939
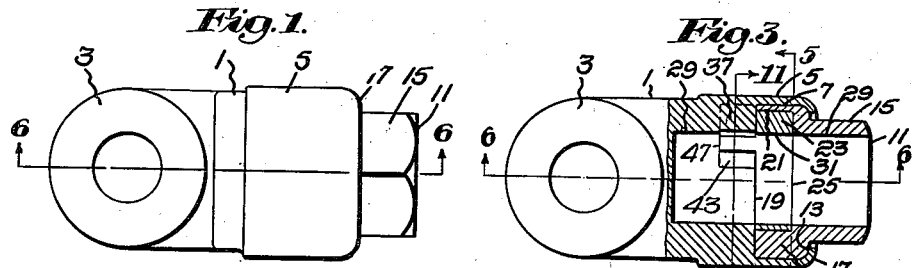
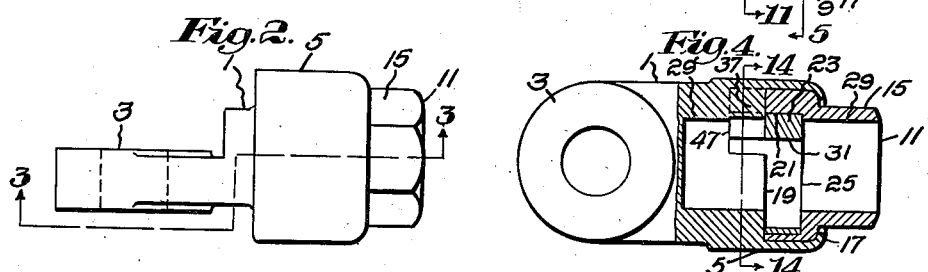
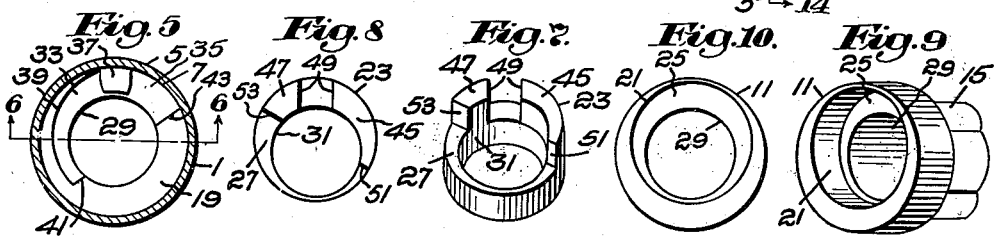
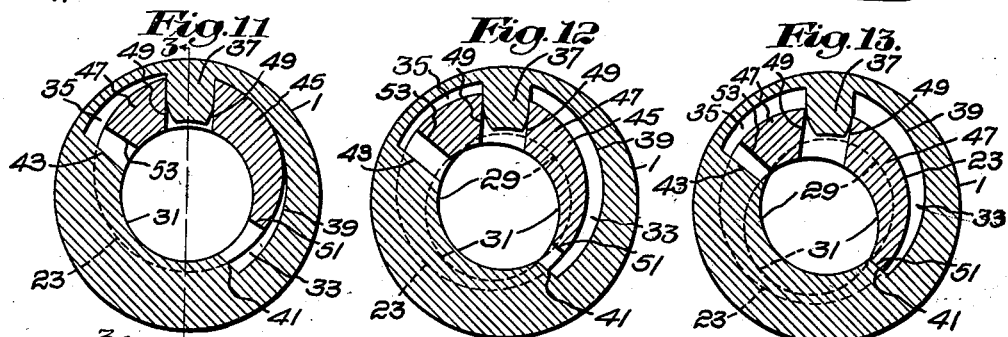
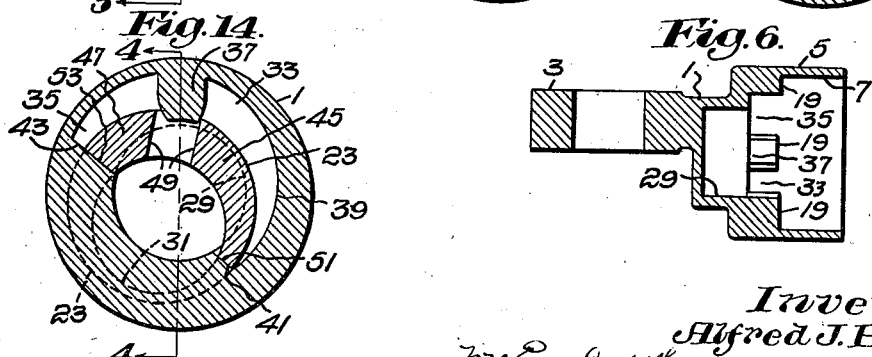
Inventor:
Alfred J. Hixon,
Attys.

Patented Dec. 2, 1941

2,264,754

UNITED STATES PATENT OFFICE 2,264,754

CABLE CONNECTOR

Alfred J. Hixon, Braintree, Mass.

Application December 14, 1939, Serial No. 309,203

7 Claims. (Cl. 173—269)

My invention relates to cable connectors, and has among its objects the provision of a device of simple and rugged construction in which the cable cannot be loosened from the connector as a result of twisting strains on the cable, and in which the possibility of damage to the connector by the operator is reduced to a minimum.

The invention will be best understood from the following description when read in the light of the accompanying drawing of an embodiment of the invention, the scope of which latter will be more particularly pointed out in the appended claims.

In the drawing—

Fig. 1 is a plan of a connector according to the invention;

Fig. 2 is a side elevation according to Fig. 1;

Fig. 3 is a section on the line 3—3 of Fig. 2, this section line also being placed on Fig. 11 for convenience in following the drawing;

Fig. 4 is a section corresponding to Fig. 3 with the parts moved to a different operative position, and corresponds to a section on the line 4—4 of Fig. 14;

Fig. 5 is a section on the line 5—5 of Fig. 3, with the inner relatively rotatable member and the cable gripper omitted;

Fig. 6 is a section on the line 6—6 of Fig. 1, with the inner relatively rotatable member and the cable gripper omitted, this section line also being placed on Figs. 3 and 5 for convenience in following the drawing;

Fig. 7 is a perspective of the cable gripper;

Fig. 8 is a plan view of the cable gripper according to Fig. 7;

Fig. 9 is a perspective of the inner rotary member;

Fig. 10 is an end view of the member according to Fig. 9;

Fig. 11 is a section, on an enlarged scale, on the line 11—11 of Fig. 3 showing the device in fully open position;

Figs. 12 and 13 are sections corresponding to Fig. 11 with the parts in different operative positions; and Fig. 14 is a section on the line 14—14 of Fig. 4 showing the device in fully closed position.

The device illustrated comprises an outer member 1 formed at one end with a perforated lug 3 for attachment of the device to a bus-bar or the like. At its opposite end the member 1 is formed with an enlargement 5 having an outwardly opening socket 7. Rotatably received in this socket is the head 9 of an inner member 11 formed interiorly of the socket with a shoulder 13, and, exteriorly thereof, with a nut portion 15.

After insertion of the head 9 into the socket 7 the edges of the enlargement 5 at the opening of the socket are bent over the shoulder 13, as indicated at 17, to hold the members 1 and 11 in assembled relation. The peripheral walls of this socket form a bearing surface for the exterior walls of the head 9 of the member 11, the head 9 resting against the bottom wall surface 19 of the socket.

As illustrated, the inner end of the head 9 of the member 11 is formed with a cylindrical recess or socket 21 eccentric to the axis of relative rotation of the members 1 and 11. Rotatably received in this socket is a cable gripper 23, the peripheral walls of the socket forming a bearing for the exterior walls of the cable gripper. In the assembled device shown one end surface of the cable gripper abuts with the bottom surface 25 of the socket 21, while its opposite end surface 27 abuts with the bottom surface 19 of the socket 7 of the member 1 so as to retain the cable gripper in operative relation to the other parts.

As illustrated, the members 1 and 11 are provided with bores 29 aligned with each other and positioned co-axially with the axis of relative rotation of said members. The cable gripper is provided with a bore 31 which, as shown, is in alignment with the bores 29 when the members 1 and 11 are in their relative position shown by Figs. 3 and 11, and is out of alignment with said bores when the members 1 and 11 are in their relative position shown by Figs. 4, 12, 13 and 14.

As illustrated, the bottom surface 19 of the socket 7 of the member 1 is recessed to provide arcuate recess portions 33 and 35 opening laterally into the bore 29 of that member and separated by a gear tooth like lug 37. As shown, the wall surface 39 of the portion 33 of this recess opposite the bore 29 is eccentric to said bore. The ends of the recesses 33 and 35 opposite the lug 37 terminate in surfaces 41 and 43 respectively. The surfaces 39, 41 and 43 form abutments coacting with the cable gripper in a manner now to be explained.

As shown, the end of the cable gripper adjacent the bottom of the socket 7 of the member 1 is provided with a projection 45 entering the recess portion 33 of that member and with a second projection 47 entering the recess portion 35 of the member. These projections 45 and 47 are so spaced that their adjacent end surfaces 49 contact with opposite sides respectively of the gear tooth like lug 37 when the parts are in the position shown by Figs. 11, 12 and 13. The end surfaces 51 and 53 of these projections contact with the abutment surfaces 41 and 43 respectively when the parts are in the position shown by Fig. 14.

When the parts are in the position shown by Figs. 1 and 11 a cable may be freely inserted through the aligned bores 29 and 31. The inner member 11 may then be turned counter-clockwise relative to the outer member 1 as viewed in Fig. 11, or the outer member 1 turned clockwise relative to the inner member 11, to cause the cable gripper to move transversely of these members and place its bore out of alignment with the bores 29, and in this way grip the cable. This transverse movement of the gripper, when the members 1 and 11 are relatively rotated, is caused by coaction of the surfaces 49 of the gripper with the gear tooth like lug 37, which coaction prevents substantial rotation of the gripper on its eccentric bearing, that is to say, rotation relative to the member 1 carrying the lug.

It will be observed that when the parts are in position shown by Fig. 11 the outer peripheral surface of the projection 45 of the cable gripper rests against the outer wall surface 39 of the portion 33 of the recess in the member 1. Thus in this way the surface 39 constitutes a stop for determining the fully open position of the connector. When the parts are in their relative position shown by Fig. 14 the two surfaces 51 and 53 of the projections 45 and 47 of the cable gripper rest against the surfaces 41 and 43 respectively. In this latter way the surfaces 41 and 43 act as a stop for determining the fully closed position of the connector.

Ordinarily the relative rotation of the members 1 and 11 is effected by the operator placing a wrench on the nut 15 to turn the member 11. This frequency has resulted, with devices as heretofore constructed, in breakage of the stops for determining the limits of movement of the cable gripper. Such breakage is effectively prevented in the device according to the present invention on account of the rugged nature of the stops which are provided in the simple manner described.

It will be observed that, when the cable is gripped in any of the positions shown by Figs. 12, 13 and 14, twisting of the cable tending to rotate it will tend to rotate the gripper on its eccentric bearing, and would result in loosening the cable were not means provided for preventing such rotation. In the present construction this rotation is prevented because, in the positions of parts shown by Figs. 12 and 13 for example, the gear tooth like lug 37 is continuously in engagement with the two surfaces 49 of the projections 45 and 47 of the cable gripper. The parts may be so constructed, if desired, that in the position shown by Fig. 13 the surface 53 of the cable gripper contacts also with the surface 43. However, when the device is constructed as illustrated, further closure of the device from the position shown by Fig. 13 may be effected by continued relative rotation of the members 1 and 11 until the parts are in the position shown by Fig. 14, in which latter position the surface 53 is in contact with the surface 43. This continued rotation from the position of parts shown by Fig. 13 to that shown by Fig. 14 takes place with the surface 51 in contact with the surface 41 and rocking on it as a pivot, and with the right hand surface 49, as viewed in these figures, in contact with the gear tooth like lug 37, so as to prevent twisting of the cable from rotating the cable gripper on its eccentric bearing when the gripping action occurs intermediate the positions shown by Figs. 13 and 14.

It will be understood that, within the scope of the appended claims, wide deviations may be made from the form of the invention herein described without departing from the spirit of the invention.

I claim:

1. A cable connector having, in combination, relatively rotatable first and second parts restrained against separation; a cable gripper mounted on said first part for rotation relative thereto about an axis eccentric to the axis of relative rotation of said parts; said parts having bores for receiving a cable, and said gripper having a through opening so shaped and positioned as to permit free passage therethrough of a cable inserted in said bores when said gripper is in one rotative position relative to said first part, and to grip such cable when in another such rotative position; said gripper and second part having cooperating lug and recess portions forming cooperating abutments for preventing substantial relative rotation between said gripper and second part when the latter and said first part are relatively rotated and between said gripper and first part when a gripped cable is twisted in a direction acting to move the gripper in cable releasing direction, and acting as stops for limiting the relative rotation of said first and second parts in each of opposite directions.

2. A cable connector having, in combination, relatively rotatable first and second parts restrained against separation; a cable gripper mounted on said first part for rotation relative thereto about an axis eccentric to the axis of relative rotation of said parts; said parts having bores for receiving a cable, and said gripper having a through opening so shaped and positioned as to permit free passage therethrough of a cable inserted in said bores when said gripper is in one rotative position relative to said first part, and to grip such cable when in another such rotative position; said gripper and second part having cooperating means comprising a lug on said second part and a recess in said gripper for receiving said lug for preventing substantial rotation of said gripper relative to said second part when said parts are relatively rotated; said gripper having a lug and said second part having a recess for receiving said lug, which latter recess is so formed as to provide cooperating pairs of abutments for limiting the relative rotation of said parts in each of opposite directions.

3. A cable connector having, in combination, relatively rotatable first and second parts restrained against separation; a cable gripper mounted on said first part for rotation relative thereto about an axis eccentric to the axis of relative rotation of said parts; said parts having bores for receiving a cable, and said gripper having a through opening so shaped and positioned as to permit free passage therethrough of a cable inserted in said bores when said gripper is in one rotative position relative to said first part, and to grip such cable when in another such rotative position; said gripper and second part having cooperating means comprising a recess in one and a lug on the other for preventing substantial rotation of said gripper relative to said second part when said parts are relatively rotated; said second part having a recess other than said first mentioned recess and said gripper having a projecting portion other than said lug extending into said recess in said second part, which portion of said gripper is movable relative to the walls of said recess in said second part and cooperates with said walls to cause the latter to act as stops for limiting the relative rotation of said parts in at least one direction.

4. A cable connector having, in combination, relatively rotatable first and second parts restrained against separation; a cable gripper mounted on said first part for rotation relative thereto about an axis eccentric to the axis of relative rotation of said parts; said parts having bores for receiving a cable, and said gripper having a through opening so shaped and positioned as to permit free passage therethrough of a cable inserted in said bores when said gripper is in one rotative position relative to said first part, and to grip such cable when in another such rotative position; said gripper and second part having cooperating means comprising a recess in one and a lug on the other for preventing substantial rotation of said gripper relative to said second part when said parts are relatively rotated; said second part having a recess other than said first mentioned recess and said gripper having a projecting portion other than said lug extending into said recess in said second part, which portion of said gripper is movable relative to the walls of said recess in said second part and cooperates with said walls to cause the latter to act as stops for limiting the relative rotation of said parts in each of opposite directions.

5. A cable connector having, in combination, relatively rotatable first and second parts restrained against separation; a cable gripper mounted on said first part for rotation relative thereto about an axis eccentric to the axis of relative rotation of said parts; said parts having bores for receiving a cable, and said gripper having a through opening so shaped and positioned as to permit free passage therethrough of a cable inserted in said bores when said gripper is in one rotative position relative to said first part, and to grip such cable when in another such rotative position; a recess and a lug received thereby, of which one is formed on said gripper and the other on said second part, for preventing substantial relative rotation of said gripper relative to that part when the latter and said first part are relatively rotated, and for preventing twisting of a gripped cable from substantially rotating said gripper relative to said first part in a direction which would release the cable when the first part and said second part are rotatively stationary relative to each other; said second part being formed with a recess, opening into the bore of said part, for receiving a portion of said gripper, said portion of said gripper engaging the wall of said recess opposite said bore when said first and second parts are in one relative rotative position, whereby to provide a stop for limiting such relative rotation in one direction.

6. A cable connector having, in combination, relatively rotatable first and second parts restrained against separation; a cable gripper mounted on said first part for rotation relative thereto about an axis eccentric to the axis of relative rotation of said parts; said parts having bores for receiving a cable, and said gripper having a through opening so shaped and positioned as to permit free passage therethrough of a cable inserted in said bores when said gripper is in one rotative position relative to said first part, and to grip such cable when in another such rotative position; a recess and a lug received thereby, of which one is formed on said gripper and the other on said second part, for preventing substantial relative rotation of said gripper relative to that part when the latter and said first part are relatively rotated, and for preventing twisting of a gripped cable from substantially rotating said gripper relative to said first part in a direction which would release the cable when the first part and said second part are rotatively stationary relative to each other; said second part being formed with a recess, opening into the bore of said part, for receiving a portion of said gripper, said portion of said gripper engaging the wall of said recess opposite said bore when said first and second parts are in one relative rotative position, whereby to provide a stop for limiting such relative rotation in one direction; the last mentioned recess providing a pair of abutment surfaces spaced angularly of said second part, said portion of said gripper which extends into said recess being formed with a pair of abutment surfaces spaced angularly of said gripper for contacting with the first abutment surfaces when said first and second parts are in another relative rotative position, whereby to provide a stop for limiting such relative rotation in the opposite direction.

7. A cable connector having, in combination, an outer part formed with a socket the peripheral wall of which provides an interior bearing surface, an inner part mounted on said bearing surface for rotation relative to said outer part, said parts being restrained against axial separation and being provided with substantially aligned cable receiving bores, said inner part being provided with a socket surrounded by said bearing surface and opening toward the bottom of said socket of said outer part, the peripheral wall of the socket of said inner part forming an interior cylindrical bearing eccentric to the axis of relative rotation of said parts, a cable gripper received in said socket of said inner part and retained therein by coaction with the bottom of the socket of said outer part, which cable gripper has an exterior cylindrical surface cooperating with the interior cylindrical bearing of said inner part to provide for relative rotation of said cable gripper and inner part, said cable gripper having a through perforation extending in the direction of the axis of relative rotation of said parts but being eccentric to said axis to substantially the same degree as said bearing of said inner part is eccentric to said axis, the bottom of said socket of said outer part having a pair of spaced arcuate recesses opening laterally thereof into the cable receiving bore of said part, the material between the adjacent ends of said recesses forming a gear tooth like part projecting inwardly from the outer walls of said recesses toward the axis of relative rotation of said parts and the ends of each recess opposite said gear tooth like part providing abutment surfaces extending in the direction of said axis, said cable gripper having, on its end facing the bottom of said socket of said outer part, a pair of spaced arcuate projections respectively received by said recesses of said outer part, the adjacent ends of said projections cooperating with opposite sides of said gear tooth like part to prevent material rotation of said gripper relative to said outer part when said parts are relatively rotated, and to prevent a gripper cable from materially rotating said gripper relative to said inner part when the latter and said outer part are rotatively stationary relative to each other, the outer wall of one of said projections contacting with a substantial extent of the outer wall of one of said recesses when the perforation of said gripper is substantially aligned with the bores of said parts, and, when the perforation of said gripper is farthest out of alignment with said bores, the remote ends of said arcuate projections of said gripper contacting with said abutment surfaces formed by said arcuate recesses.

ALFRED J. HIXON.

CERTIFICATE OF CORRECTION.

Patent No. 2,264,754. December 2, 1941.

ALFRED J. HIXON.

It is hereby certified that error appears in the printed specification of the above numbered patent requiring correction as follows: Page 3, second column, line 75, claim 7, for "gripper" read --gripped--; and that the said Letters Patent should be read with this correction therein that the same may conform to the record of the case in the Patent Office.

Signed and sealed this 27th day of January, A. D. 1942.

(Seal)
                                            Henry Van Arsdale,
Acting Commissioner of Patents.